United States Patent [19]

DeGeorge et al.

[11] Patent Number: 4,586,195
[45] Date of Patent: Apr. 29, 1986

[54] MICROPHONE RANGE FINDER

[75] Inventors: Martin DeGeorge, Cinnaminson, N.J.; Hartwig Ruell, Fuerstenfeldbruck, Fed. Rep. of Germany; John Welch, Mount Laurel, N.J.

[73] Assignee: Siemens Corporate Research & Support, Inc., Iselin, N.J.

[21] Appl. No.: 624,442

[22] Filed: Jun. 25, 1984

[51] Int. Cl.$^4$ ............................................. H04R 3/00
[52] U.S. Cl. ...................................... 381/92; 381/122; 367/96; 367/104
[58] Field of Search ........................ 381/56, 57, 92, 95, 381/110, 122; 179/18 BC, 121; 367/125, 198, 104, 120, 129, 96, 99, 97

[56] References Cited

U.S. PATENT DOCUMENTS

| 3,555,192 | 1/1971 | Hymer | 381/110 |
|---|---|---|---|
| 3,710,332 | 1/1973 | Tischner et al. | 367/125 |
| 3,763,465 | 10/1973 | Tatge et al. | 367/120 |
| 3,884,170 | 5/1975 | Jensen | 367/96 |
| 3,890,914 | 6/1975 | Gardner | 367/96 |
| 4,255,799 | 3/1981 | Laing | 367/96 |
| 4,333,170 | 6/1982 | Mathews et al. | 367/125 |
| 4,449,238 | 5/1984 | Lee et al. | 381/110 |
| 4,455,677 | 6/1984 | Fox | 381/95 |
| 4,485,484 | 11/1984 | Flanagan | 381/92 |
| 4,489,442 | 12/1984 | Anderson et al. | 381/110 |

FOREIGN PATENT DOCUMENTS

| 46-36074 | 10/1971 | Japan | 381/110 |
|---|---|---|---|
| 54-34226 | 3/1979 | Japan | 381/92 |
| 54-107725 | 8/1979 | Japan | 381/92 |
| 498760 | 3/1976 | U.S.S.R. | 381/92 |
| 48110 | 10/1981 | U.S.S.R. | 381/92 |

Primary Examiner—Forester W. Isen

[57] ABSTRACT

A microphone ranging system for providing improved reproduced speech by compensating for the position of a speaker relative to the microphone system. An omnidirectional microphone system with a range finder for determining the distance between the omnidirectional microphone and a speaker is provided. In further embodiments, there are also provided a multiplicity of spaced range finders for determining the exact position of a speaker or speakers relative to a microphone or several microphones. Highly directional microphones are used which are trained on the speaker or speakers and follow them as they move about a room. A tracking system is controlled through signals which originate in a control circuit which is controlled by the range finders.

9 Claims, 3 Drawing Figures

MICROPHONE RANGE FINDER

BACKGROUND OF THE INVENTION

This invention relates to a microphone range finder, in particular, to a microphone system in which the relative position of a speaker to the microphone is determined and wherein compensation for said relative position are included to obtain an improved audio response.

There are two basic types of noise suppressing microphones known in the art:

(1) "Shotgun" microphones which are very directional; and (2) "Close talking" or "Noise Cancelling" microphones which are omnidirectional but sensitive to sound originating from the immediate vicinity of the microphone only.

Both types of microphones operate poorly when the source of the sound (e.g. the person speaking) is not exactly where it is expected to be. The result is considerably reduced volume which must be compensated for in some way.

To compensate for the above short comings, present day systems employ automatic gain control amplifiers to provide appropriate gain in dependence upon the energy contained in a microphone signal. However, automatic gain control tends to clip the beginning of speech so that the words "hello", for example, is transmitted as "ello". Furthermore, automatic gain control tends to reduce the quality and fidelity of speech in instances where, for example, a speaker is situated far from the microphone whereby ambient noise emenating from nearby sources or from the microphone itself is introduced into and amplified by the microphone system.

A further disadvantage of present microphone systems which employ automatic gain control is related to situations in which several speakers—who may be moving about a room—are required to address an audience. Under such circumstances, the automatic gain control may be affected by the position of each speaker relative to the microphone, and individual automatic gain control for each speaker is not practicable.

SUMMARY OF THE INVENTION

It is an object of the present invention to provide a microphone system in which the position of a speaker relative to the microphone system is accounted for and in which the output audio of the microphone system is maintained with sufficient quality and fidelity regardless of the position of the speaker with respect to the microphone system.

It is still a further object of the presnt invention to provide microphone systems with multiple microphones each of which is capable of tracking a respective speaker who is moving about a predeterminable area.

The foregoing objectives plus other features and characteristics of the invention are realized by providing a noise supressing microphone system which comprises microphone means which are capable of receiving and reacting to the speech generated by a speaker and for generating electric signals which may be reconverted to sound output and which may be amplified or atenuated as necessary. In order to keep the audio output of the microphone means constant and independent of the position of the speaker relative to the microphone means, range finding means for determining the position of the speaker relative to the microphone means are provided. Adjusting means are also provided for controlling the level of the audio output of the microphone means by controlling the gain of the microphone means in dependence of the distance and relative position of the speaker to the microphone means. Thus, the control of the gain circuit of the microphone system are affected not only by the level of incoming sound but also by the distance of the speaker to the microphone system.

According to a further embodiment of the invention a microphone system is provided in which the microphone of the system is a "shotgun" highly directional microphone which is capable of rejecting sound or noise which is not in the path of the microphone. The microphone is mounted on tracking means which allow the highly directional microphone to track and follow the speaker as he or she moves about a room. A control circuit interfaces to first and second ranging means which allow it to precisely determine the position of the speaker in a room and to generate signals to the tracking means which allow the tracking means to follow the speaker. The ranging means include sonar transmitting and receiving circuits which allow the distance from the first and the second ranging means to the speaker to be determined and the position of the speaker ascertained through the method of triangulation.

According to preferred embodiments of the invention the tracking means include an electrical motor or an electric servo-motor.

In a further preferred embodiment the microphone system can accomodate several speakers who move about a room by tracking each individual speaker and by aiming a separate microphone at each speaker to ensure that ambient noise emenating or attributal to sources other than the speaker is filtered out. Accordingly, there are provided a plurality of "shotgun" directional microphones and the range finding means may be employed in conjunction with individual response means carried by each of the speakers to allow determination of the position of each speaker. Each of the separate response devices carried by each of the speakers is capable of detecting a specific sonar frequency and responding by outputting its own unique frequency or sonar pulse. The range finding means which again comprise a first and second ranging means serially transmit specific frequencies or codes to locate each speaker, through the unique response generated by each of the response devices carried by each speaker. The ranging means in conjunction with the control circuitry are capable of determining the position of each speaker and providing control signals to the tracking systems to point a corresponding microphone at each speaker.

Other features and advantages of the invention will be apparent from the following description of the preferred embodiments, and from the claims.

For a full understanding of the present invention, reference should now be made to the following detailed description of the preferred embodiments of the invention and to the accompanying drawings.

DETAILED DESCRIPTION

Preferred embodiment of the invention will now be described with reference to FIGS. 1 to 3 of the drawings.

Figure 1:
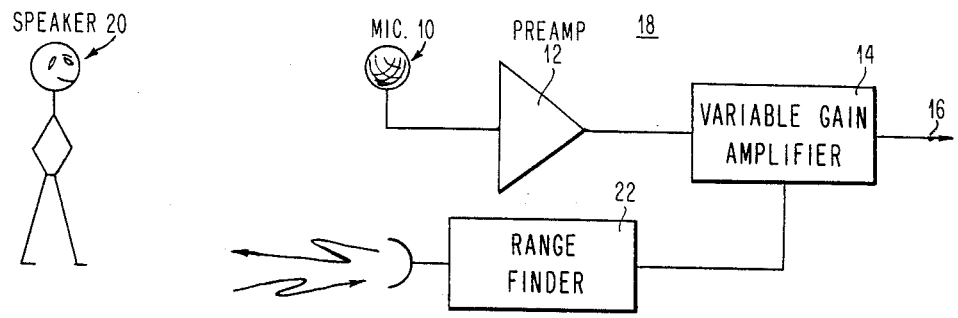
FIG. 1 shows a block diagram of the system wherein a omnidirectional microphone in conjunction with the range finder is used for determining the distance between the microphone system and speaker.

In FIG. 1 there is shown a microphone system which is used for receiving speech from a speaker and for amplifying or transmitting the speech to other locations. The microphone of FIG. 1 is a "close talking" or "noise cancelling" microphone 10. Microphones of this type are omnidirectional but sensitive to sound originating only a few feet away. The electrical signals generated by the microphone 10 are input into a preamp 12 and from the preamp into a variable gain amplifier 14. The output from the variable gain amplifier 16 may be connected to a sound generating system (not shown) or transmitted over electrical wires to remote locations for processing, storage or other uses. To assure high fidelity and a pleasant sound, the variable gain amplifier 14 of the microphone system 18 must account for variations due to speech characteristics of different speakers i.e. loudness or modulation etc. and for the position of a speaker 20 relative to the microphone system 18. In certain circumstances as a speaker moves further away from the microphone 10 an increase in the gain of the variable gain amplifier 14 may result in a deterioration of the quality of sound generated by the system. This may be due to undesired amplification of ambient noise originating from sources closer to the omnidirectional microphone 10. In sophisticated systems it may be advantageous to tailor the frequency response of the microphone system such that when a speaker moves further away from the microphone system 18 filtering techniques are used to filter out ambient noise which is not directly in the range of speech frequencies which are to be reproduced.

In accordance with the present embodiment a range finder 22 is provided for determining the distance between the speaker 20 and the microphone system 18. The range finder 22 may be a sonic range finder of the type referred to in U.S. Pat. No. 4,192,587 at column 4, line 63. Such range finders output a sonic pulse which strikes an intended target and generates an echo which may be received by the range finder. The range finder calculates the distance to the target by measuring the travel time of the pulse to and from the target and by deriving distance based on a knowledge of the speed of the propogating sonic pulse.

Therefore, in accordance with the present embodiment the range finder 22 continuously provides the variable gain amplifier with updated information as to the distance of the speaker 20 relative to the microphone system 18. The distance information may be provided through analog signals or may comprise digital words for controlling gain in the variable gain amplifier 14. The provided signals may control directly the amplification in the variable gain amplifier 22 and/or may trigger special circuitry to enable the operations of speech filters which may apply different gain factors to different spectrums of the speaker's speech. The variable gain of the amplifier need not be proportional to the distance of the speaker and may be tailored to generate an amplification factor which is non-linear in order to further improve the characteristics of the amplifier system 18.

Situations exist in which the omnidirectional microphone described above is unsuitable due to either (a) desirability of allowing a speaker to move further away from the microphone or (b) the presence of excessive ambient noise which unavoidably is received by the microphone and amplified along with the speech of the speaker.

Accordingly, the invention provides in a preferred embodiment (see FIG. 2) an arrangement in which two sets of range finders 24 and 26 of the type described above are used for locating a speaker 20 within a room. A highly directional microphone 28 is provided which is aimed at the speaker and which rejects speech or audio energy which originates from other directions. FIG. 2 shows one such arrangement. A first range finder 24 is situated in one corner of a room 30 and its energy covers most of the area which is enclosed in the block marked "Room". The first range finder 24 can monitor the speaker and continuously provide information as to the distance between the speaker 20 and the first range finder 24. The second range finder 26 is located away from the first range finder 24 and performs the identical function of determining the distance between itself and the speaker 20.

Now that the distances between the speaker 20 and each of the two range finders 24 and 26 are known it is possible to accurately determine the position of the speaker 20 relative to the microphone 28. This may be accomplished through a "triangulation" method and is explained with reference to FIG. 3 of the drawings. In FIG. 3 the first range finder 24, the second range finder 26 and the speaker 20 are shown connected by a series of lines marked with letters. "A" represents the distance between the first range finder 24 and the speaker 20 while "B" represents the corresponding distance between the second range finder 26 and the same speaker. The distance F is the distance between the first and the second range finders 24 and 26 its value is known and may be easily ascertainable by measuring the distance thereof. According to trigonometric rules the triangle ABF may subdivided into two right triangles which may be referred to as right triangle ACD and right triangle BCE. It is well known that the hypotenuse of a right triangle is equal to the square root of the sum of the squares of its two sides. Stated differently, it may be said with reference to right triangle ACD that $A^2 = C^2 + D^2$. The same relationship expressed in terms of right triangle BCE provides that $B^2 = C^2 + E^2$ by subtracting the second equation from the first there results that $A^2 - B^2 = D^2 - E^2$. It would be readily apparent that the quantity $A^2 - B^2$ is known because they represent the measured distances AB obtained by the two range finders. Additionally, by recognizing that D and E are related through the equation $D + E = F$ and that F is known as a substitution for E in the equation $A^2 - B^2 = D^2 - E^2$ can be made to represent E in terms of D and F. Since F is known it is simple to solve for the quantity D which once determined may provide all the information which is necessary to determining the angle which provides directional information of the target i.e. speaker relative to the range finder 24. The information as to the position of the speaker in the room 30 may be provided to an electronic control circuitry (not shown) which is used to control the highly directional microphone 28 shown in FIG. 2 by training the microphone on the speaker 20. The highly directional microphone is mounted on a tracking system 32 which may be an electrical DC motor or a servo motor and which operationally carries the microphone and aims it at the speaker 20.

Figure 2:
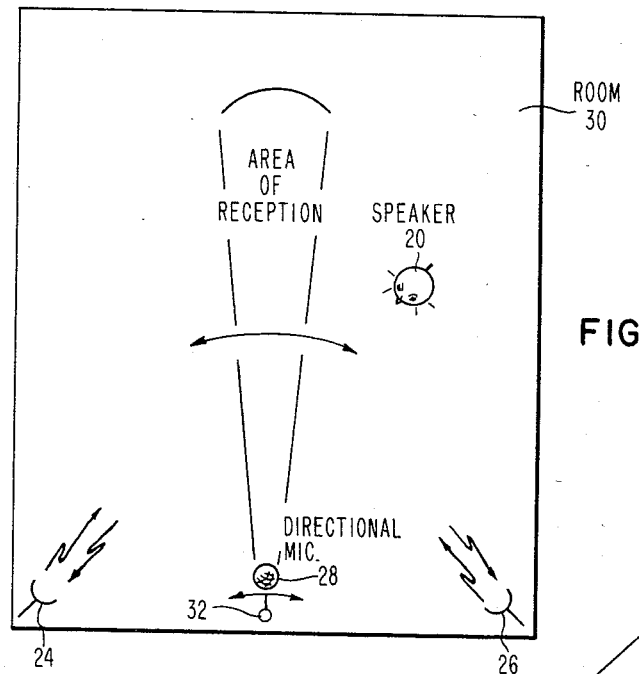
FIG. 2 is a block diagram of the system in which a highly directional microphone is used and in which through the method of triangulation the position of a speaker relative to the microphone is found.
Figure 3:
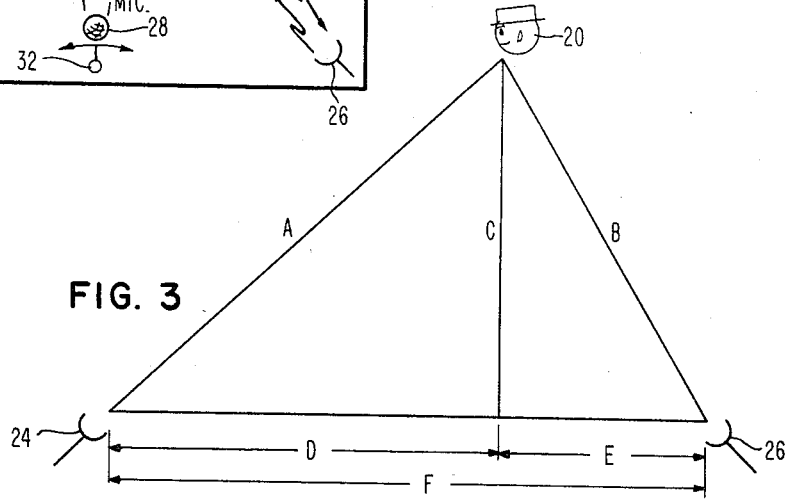
FIG. 3 is presented for explaining the triangulation method of locating an object in a plane.

Preferred embodiments of the invention provide that the microphone of FIG. 2 actually comprises several microphones which are mounted on a tracking system which can train and point each of the multitude of microphones at a respective speaker. To accomplish the above the control circuitry of the microphone system provides that the first and second range finders issue in sequence a series of distinct audio frequency pulses by which the location or position of each of several speakers is determined. Each speaker carries a response device which responds to a unique frequency and outputs upon detecting a pulse of that frequency a pulse train of a different but also unique frequency. Thus the position of each speaker is determined periodically and information regarding the position of the respective speaker is provided to the control circuitry which aims one of the several microphones of the tracking system onto a respective speaker. The last mentioned preferred embodiment is particularly advantageous and attractive in situations in which several speakers who form a panel address a large crowd where ambient noise and other restrictions dictate that the speech attributable only to the speakers be allowed into the microphone system. Or it may be that it is desirable to allow each speaker to move about an auditorium and have an individual highly directional microphone track each speaker's movements.

There has thus been shown and described a novel microphone with a ranging system which fulfills all the objects and advantages sought therefor. Many changes, modification, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A noise suppressing microphone system, comprising:
   (a) microphone means for receiving audio information, said means being responsive thereto to generate electrical audio signals;
   (b) range finding means for determining the position of a speaker relative to said microphone means; and
   (c) adjusting means for controlling the level of said electrical audio signals of said microphone means, said adjusting means being responsive to said range finding means to control said microphone means.

2. The microphone system of claim 1, wherein said microphone means comprise an omnidirectional noise cancelling microphone, wherein said range finding means are operative for determining the distance between said speaker and said microphone means and wherein said adjusting means comprise variable gain means, said variable gain means being responsive to said direct distance and being operative for generating a gain value for said microphone system in accordance with a predetermined function.

3. The microphone system according to claim 2, wherein said variable gain means are further responsive to the level of said audio information in addition to being responsive to said distance.

4. The microphone system as recited in claim 2, wherein said range finding means comprise:
   (a) transmitting means, located in close proximity to said microphone means, for transmitting a burst of sonic energy;
   (b) receiving means, located in close proximity to said transmitting means, for receiving an echo of said burst of sonic energy from said speaker; and
   (c) computing means for computing the distance from said microphone means to said speaker, said distance being derived from the time of transit of said burst of sonic energy from said transmitting means to said speaker and then back to said receiving means.

5. The microphone system of claim 1, wherein:
   (a) said microphone means comprise a "shotgun" highly directional microphone;
   (b) said range finding means comprise:
      (1) first ranging means for determining the distance between said first means and said speaker;
      (2) second ranging means for determining the distance between said second means and said speaker, said second ranging means being located with respect to said first ranging means to allow the determination of the position of said speaker relative to said range finding means;
   (c) tracking means for rotationally mounting said highly directional microphone thereon; and
   (d) control means for computing the position of said speaker relative to said highly directional microphone and for controlling said tracking means to point said highly directional microphone toward said speaker.

6. The microphone system of claim 5, wherein said control means are coupled to said first and second ranging means and wherein said control means employ a triangulation method for determining said position of said speaker.

7. The microphone system of claim 6, wherein said tracking means comprise an electrical motor.

8. The microphone system of claim 7, wherein said motor comprises a servo motor.

9. The microphone system of claim 1, wherein:
   (a) said microphone means comprise a plurality of "shotgun" highly directional microphones;
   (b) said range finding means comprise:
      (1) first ranging means; and
      (2) second ranging means spaced apart from said first means, said first and second ranging means being operative for determining, by triangulation, the positions of said speaker and of additional speakers relative to said microphone means;
   (c) said system further comprises a plurality of response means, each of said plurality of response means being operative for responding to a respective unique sonic frequency by outputting a unique response frequency, whereby each of said speaker and said additional speakers carries one of said response means;
   (d) said system further comprises tracking means for rotational mounting each of said plurality of said highly directional microphones; and
   (e) said system further comprises control means for controlling said range finding means to allow said means to locate each of said speaker and said additional speakers and for controlling said tracking means to point each of said plurality of highly directional microphones toward a respective one of said speaker and said additional speakers.

* * * * *